United States Patent
Bertram et al.

(10) Patent No.: US 9,526,395 B2
(45) Date of Patent: Dec. 27, 2016

(54) AUTOMATIC DISHWASHER

(71) Applicant: Miele & Cie. KG, Guetersloh (DE)

(72) Inventors: Andre Bertram, Bielefeld (DE); Tobias Dahms, Hannover (DE)

(73) Assignee: MIELE & CIE. KG, Guetersloh (DE)

(*) Notice: Subject to any disclaimer, the term of this patent is extended or adjusted under 35 U.S.C. 154(b) by 146 days.

(21) Appl. No.: 14/187,356

(22) Filed: Feb. 24, 2014

(65) Prior Publication Data

US 2014/0238442 A1 Aug. 28, 2014

(30) Foreign Application Priority Data

Feb. 26, 2013 (DE) .................. 10 2013 101 862

(51) Int. Cl.
*A47L 15/00* (2006.01)
*A47L 15/42* (2006.01)
*A47L 15/48* (2006.01)

(52) U.S. Cl.
CPC ........ *A47L 15/0042* (2013.01); *A47L 15/0047* (2013.01); *A47L 15/4291* (2013.01); *A47L 15/488* (2013.01); *Y02B 30/52* (2013.01); *Y02B 40/44* (2013.01)

(58) Field of Classification Search
CPC .................................................. A47L 15/0042
See application file for complete search history.

(56) References Cited

U.S. PATENT DOCUMENTS

2010/0243002 A1 9/2010 Grunert et al.
2012/0167920 A1 7/2012 Bertram et al.

FOREIGN PATENT DOCUMENTS

| DE | 6933648 U | 7/1970 |
|---|---|---|
| DE | 1929063 A | 1/1971 |
| DE | 1610189 A1 | 8/1971 |
| DE | 2643173 A1 | 4/1977 |
| DE | 3738031 A1 | 5/1989 |
| DE | 19547613 A1 | 6/1996 |
| DE | 10002742 C1 | 6/2001 |
| DE | 102007052835 A1 | 5/2009 |
| DE | 102009028011 A1 | 2/2010 |
| DE | 102011000042 A1 | 7/2012 |
| EP | 2206824 A2 | 7/2010 |
| EP | 2386674 A2 | 11/2011 |
| EP | 2474261 A2 | 7/2012 |
| EP | 2478969 A1 | 7/2012 |
| FR | 2325350 A1 | 4/1977 |
| GB | 1307969 A | 2/1973 |
| JP | 2007125198 A | 5/2007 |

*Primary Examiner* — Jason Ko
(74) *Attorney, Agent, or Firm* — Leydig, Voit & Mayer, Ltd.

(57) ABSTRACT

An automatic dishwasher includes a heat pump device for heating washing liquid. The heat pump device includes an evaporator, a fan adapted to supply ambient air to the evaporator, and a device for wet dust collection connected upstream of the evaporator in the flow direction of the ambient air.

8 Claims, 2 Drawing Sheets

AUTOMATIC DISHWASHER

CROSS-REFERENCE TO RELATED APPLICATIONS

Priority is claimed to German Patent Application No. DE 10 2013 101 862.9, filed on Feb. 26, 2013, the entire disclosure of which is hereby incorporated by reference herein.

FIELD

The invention relates to an automatic dishwasher, in particular a domestic dishwasher, having a heat pump device for heating washing liquid which has an evaporator and a fan, the fan being used to supply the evaporator with ambient air.

BACKGROUND

Automatic dishwashers of the type referred to at the outset, that is to say of the generic type, are known per se from the prior art which is why there is no need for separate documentary evidence at this point.

Automatic dishwashers of the type referred to at the outset have a wash tub which for its part provides a washing compartment. In the intended use case, the wash tub is used to hold the dishes to be cleaned. At the same time, the washing compartment provided by the wash tub is accessible on the user's part by way of a loading aperture. This can be sealed so as to be fluid-tight by means of a pivotably designed dishwasher door.

An automatic dishwasher has a spray device in the washing compartment to supply the dishes to be cleaned with washing liquid. This generally has two or three rotatably configured spray arms which in specified normal operation spray washing liquid conveyed by a circulating pump onto the dishes to be cleaned.

Electric heaters are typically used to heat the washing liquid. Moreover, heat pump devices for heating washing liquid have also become known from the prior art. Such heat pump devices draw heat from the space surrounding the automatic dishwasher or from the ambient air to heat the washing liquid. For this purpose, a heat pump device has an evaporator and a fan, the fan being used to supply the evaporator with ambient air sucked in by said fan.

The evaporator of the heat pump device is typically designed as a finned-tube heat exchanger and has a large number of fins arranged spaced apart from each other. In the intended use case, the outside air sucked in by the fan is guided between the fins of the evaporator where heat is transferred from the ambient air to a refrigerant of the heat pump device. As the ambient air sucked in from outside contains dust and/or dirt particles, in the intended use case the intermediate spaces formed between the individual fins of the evaporator may also become clogged with the result that it is no longer possible to guarantee perfect functioning of the heat pump device.

To counteract clogging of the evaporator due to dust and/or dirt particles, it is known from the prior art to connect a filter upstream of the evaporator in the flow direction of the ambient air. By means of such a filter, any dust and/or dirt particles in the ambient air can be largely eliminated before the ambient air that is sucked in is fed through the evaporator which results in the functionality of the evaporator being maintained.

Although previously described filters have proven themselves in daily practice, there is a need for improvement. Thus on the user's part it is considered to be a particular disadvantage that previously known filters require maintenance. It is particularly necessary to carry out cleaning of the filter from time to time. If such cleaning is not done, the filter may clog up with the result that it is no longer possible to suck in sufficient ambient air for the heat pump device to function properly. In this respect, cleaning of the filter required from time to time is considered on the user's part to be inconvenient.

SUMMARY

In an embodiment, the present invention provides an automatic dishwasher comprising a heat pump device for heating washing liquid. The heat pump device includes an evaporator, a fan adapted to supply ambient air to the evaporator, and a wet dust collection device connected upstream of the evaporator in a flow direction of the ambient air.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
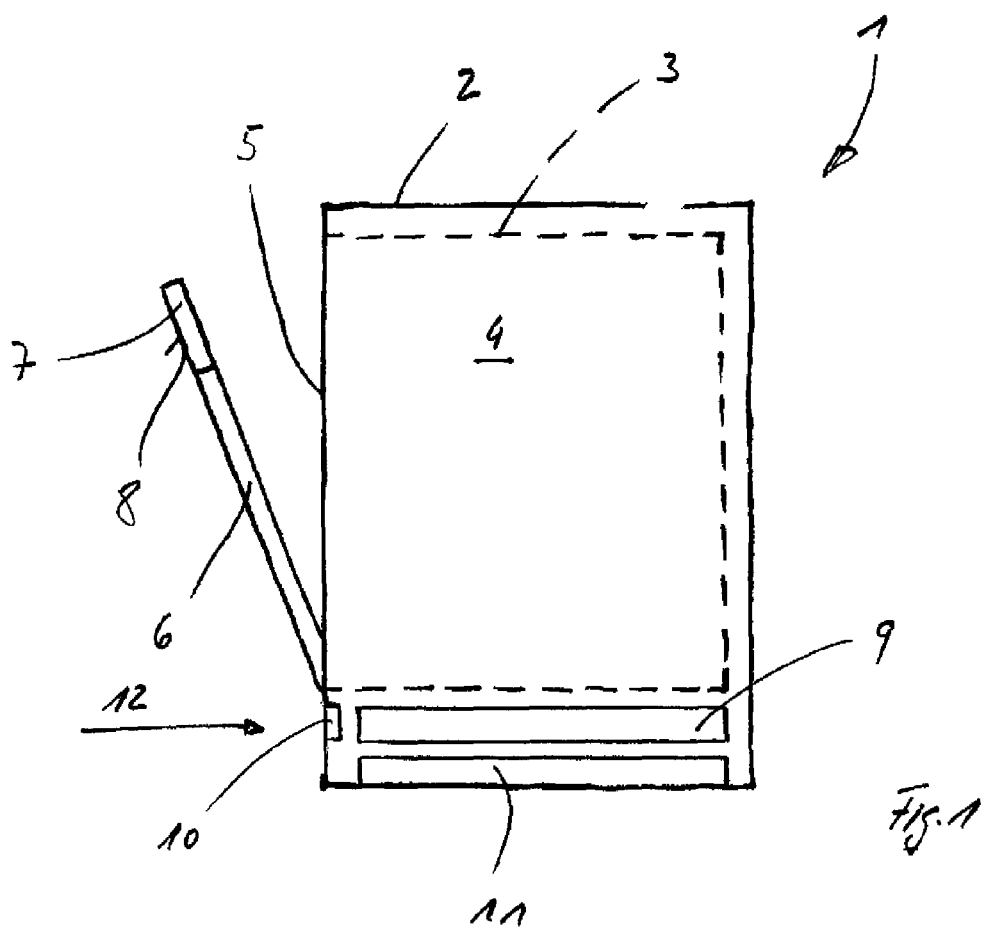
FIG. 1 shows an automatic dishwasher according to the invention in a purely schematic lateral view.

An aspect of the invention provides an automatic dishwasher to the effect that more user-friendly operation is permitted.

In an embodiment, the present invention provides an automatic dishwasher including a device for wet dust collection which is connected upstream of the evaporator in the flow direction of the ambient air.

According an embodiment of the invention, a device for wet dust collection is used as a dust and/or dirt particle filter for the ambient air. In this case, the wet medium for the device according to the invention is water, which is in fact the condensate arising anyway during specified normal operation of the heat pump device. During specified normal operation it collects in a water trough arranged underneath the heat pump device. The ambient air sucked in is routed over the condensate in the water trough which results in the entrained dust and/or dirt particles being deposited on the surface of the condensed water. Thus the ambient air which is fed to the evaporator in a further stage of the process is cleaned in a simple manner.

The condensate picks up and binds the dust and dirt particles which are deposited on the water surface of said condensate. Any dust and dirt particles previously picked up by the condensate are also disposed of when the condensate is disposed of later.

The configuration according to an embodiment of the invention is characterised in particular in that it is maintenance-free on the user's part. The dirt and dust particles picked up by the condensate in the course of carrying out a specified normal process are disposed of together with the condensate. In this respect, unlike the prior art, there is no need for the user to carry out filter cleaning separately, which is why the configuration according to the invention is more user-friendly overall.

Moreover, the configuration according to an embodiment of the invention ensures that the evaporator and/or a mechanical filter connected upstream of said evaporator does not become clogged because of dust or dirt particles in the ambient air, thus ensuring continuous trouble-free operation of the dishwasher according to the invention.

The device for wet dust collection provided according to an embodiment the invention has a water trough which is preferably arranged underneath the evaporator. In the intended use case, this water trough holds the water needed for wet dust collection, dust and dirt particles carried along by the ambient air being deposited on the water surface of the water in said water trough.

The water trough provided according to an embodiment of the invention serves the heat pump device in a preferred manner as a condensate trough. In this respect, it is preferable during specified normal operation of the heat pump device to use condensate arising at the evaporator as water for the wet dust collection. Instead of condensate it is also possible to use fresh water or a mixture of fresh water and condensate.

The water in the water trough is preferably fed into a washing compartment provided by the automatic dishwasher during the course of a wash program in such a way that no additional water is consumed even when using fresh water to fill the water trough.

Additionally proposed with the invention is a method for operating an automatic dishwasher fitted with a heat pump device and water trough in which fresh water is fed into the water trough at the beginning of a wash program.

At the beginning of a wash program, there is not yet any condensate in the water trough as the heat pump device has not been operating long enough. A full filtering effect, therefore, only begins after some time when enough condensate has collected inside the water trough. Thus, at the beginning of a wash program, it is impossible for any dust or dirt particles to be adequately eliminated from the ambient air sucked in due to the lack of water in the water trough. It is therefore proposed on the process side to feed fresh water into the water trough at the beginning of a wash program. As a result, a full filtering effect is guaranteed even at the beginning of a wash program, that is to say even at a time when no condensate has yet collected or insufficient condensate has collected in the water trough as a result of operating the heat pump device.

The water in the water trough, whether it is fresh water added at the beginning of a wash program or condensate arising during specified normal heat pump operation, is re-used by the automatic dishwasher during the course of the wash program by feeding it as washing liquid into a washing compartment provided by said automatic dishwasher. In this sense, the fresh water fed into the water trough at the beginning of a wash program is not lost for the washing process, that is to say no additional water is consumed due to feeding in fresh water which takes place at the beginning of a wash program.

Filling the water trough with fresh water has yet another advantage. With very dry ambient air, no condensate or too little condensate for a sufficiently good filtering effect arises even when the heat pump device has been running for a longish period. This problem is also remedied by feeding fresh water into the water trough at the beginning of a wash program.

At the beginning of a wash program, the water trough is preferably filled with fresh water as previously described. In this case, for an adequate filtering effect it is not necessary to fill the whole water trough with fresh water. Rather it is sufficient to fill the water trough with a quantity of water such that, during specified normal operation, the ambient air sucked in from outside wafts over the water surface of the water in the water trough in such a manner that the water precipitates any dirt or dust particles entrained in the ambient air. Typically, it is enough for this purpose to feed 0.1 l to 0.5 l, preferably 0.2 l to 0.4 l, even more preferably 0.3 l of fresh water into the water trough at the beginning of a wash program. In this case, the water trough preferably has a holding capacity of more than 0.5 l and in the continued course of the wash program it is further filled by condensate arising at the evaporator of the heat pump device. With very humid ambient air, up to 0.6 l of condensate can arise during a specified normal sequence of the process. With preceding filling of the water trough with, for example, 0.4 l of fresh water, up to approx. 1.0 l of water thus collects inside the water trough, that is 0.4 l of fresh water and 0.6 l of condensed water. This water which is in the water trough can be used at a later time during the course of the wash program with the result that the water consumption of the dishwasher according to the invention does not increase overall.

Emptying of the water trough takes place, for example, by means of a pump which is connected to a washing compartment provided by the wash tub of the automatic dishwasher and which pumps the water collecting in the water trough directly into the wash tub of said dishwasher.

According to an exemplary implementation of the process, the fresh water introduced into the water trough at the beginning of a wash program is fed in, preferably sprayed, over fins of an evaporator of the heat pump device.

It is also not possible in the intended use case to prevent dust and/or dirt particles from collecting on the fins of the evaporator of the heat pump device in spite of the filter unit connected upstream. The amount of dust and/or dirt particles can be greatly reduced by the device for wet dust collection previously described but not down to zero, the result being that it is not possible to prevent corresponding adhesions of dust and/or dirt particles on the fins of the evaporator. To guard against the evaporator becoming clogged up, it is proposed with particular advantage on the process side to spray the fresh water to be fed into the water trough over the fins of the evaporator. This ensures that any dust and/or dirt particles adhering to the fins of the evaporator are rinsed off on feeding in fresh water, that is to say the evaporator fins are cleaned. The dust and/or dirt particles rinsed off in this manner are carried away together with the fresh water fed in and collect in the water trough arranged underneath the evaporator. From here, disposal can then take place in the manner already described previously.

By carrying out a process according to an embodiment of the invention, it is thus possible that the evaporator is safely prevented from clogging up due to dust and/or dirt particles.

Thus, on the one hand, filtering is achieved by means of wet dust collection and, on the other hand, the evaporator fins are cleaned.

FIG. 1 illustrates an embodiment of an automatic dishwasher in the form of a domestic dishwasher 1 in a purely schematic diagram.

The dishwasher 1 has an outer housing 2. This accommodates a wash tub 3 which for its part provides a washing compartment 4. In the intended use case, the wash tub 3 serves to hold the dishes to be cleaned, for which purpose wash baskets are typically provided.

The washing compartment 4 provided by the wash tub 3 is accessible by way of a loading aperture 5. This can be sealed so as to be fluid-tight by means of a washing compartment door 6 arranged on housing 2.

Spray arms are arranged inside the wash tub 3 to supply the dishes to be cleaned with washing liquid.

The washing compartment door 6 has a control panel 7 to facilitate specified normal operation of the dishwasher 1. This control panel is equipped with an indicator display 8 which for the purpose of a visual display has LEDs, for example.

A heat pump device 9 serves to heat the washing liquid which is used in the intended use case for cleaning the dishes. This heat pump device is arranged level with the dishwasher 1 underneath the wash tub 3 which provides the washing compartment 4, as can be seen in particular in the diagram according to FIG. 1.

Figure 2:
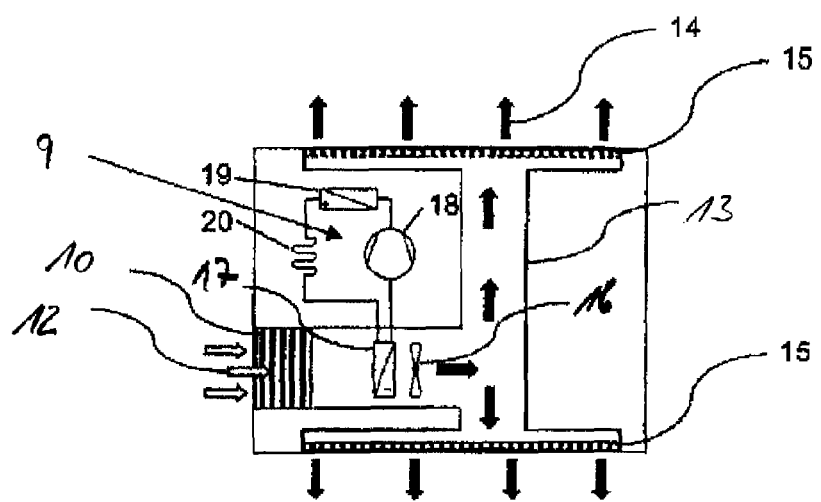
FIG. 2 shows the heat pump device of an automatic dishwasher according to FIG. 1 in a schematic plan view.

FIG. 2 shows the heat pump device 9 of the dishwasher 1 in a schematic view from above. As emerges from this diagram, the heat pump device 9 essentially has four components which are joined together hydraulically by way of a pipe system in which a working medium flows. In the flow direction of the refrigerant, the individual components are arranged such that it flows first through an evaporator 17, then through a compressor 18 and finally through a condenser 19. Subsequently, the refrigerant flows through an expansion device 20 before being fed back again to the evaporator 17.

To operate the heat pump circuit, liquid refrigerant is first sprayed into the evaporator 17. Due to the low pressure of the refrigerant in the evaporator 17, the refrigerant can evaporate at low temperatures. Subsequently, the compressor 18 sucks in the gaseous refrigerant at low pressure and compresses it to a high pressure. The refrigerant becomes hot in the process. As a result, the refrigerant contains approximately the sum of the evaporation energy and the drive energy of the compressor 18. This energy is re-released inside the condenser 19. This occurs due to condensing of the refrigerant. Finally, the liquid refrigerant is expanded to the low pressure using the throttling point 20 such that it can evaporate again in order to flow through the heat pump circuit another time.

So that this heat pump circuit functions, thermal energy must be made available to the evaporator and heat must be removed from the condenser. In the process, the evaporator, as described previously, obtains the thermal energy necessary to evaporate the refrigerant by cooling down supply air (i.e. ambient air) while the condenser releases the thermal energy to washing liquid of the dishwasher.

A fan 16 is used to supply the evaporator 17 with ambient air 12, said fan being connected downstream of the evaporator 17 in the flow direction of the outside air 12, as emerges in particular from the diagram according to FIG. 2. The ambient air 12 which is cooled down after passing the evaporator 17 then arrives via an air duct 13 at air outlets 15 on the side of the housing, through which outlets the cooled ambient air 12 exits the dishwasher 1 as exhaust air 14.

As a result of cooling down the ambient air 12 during specified normal operation of the heat pump device 9, the humidity in the air condenses and precipitates on evaporator 17. This condensate drips off the evaporator 17 as it arises and collects in a water trough 11 provided for this, said trough being arranged level with the dishwasher 1 underneath the heat pump device 9, as emerges in particular from the schematic diagram according to FIG. 1. In the further course of a wash program carried out by the dishwasher 1, this condensed water collecting in the water trough 11 can either be discarded or re-used by feeding it into the wash tub 3.

Figure 3:
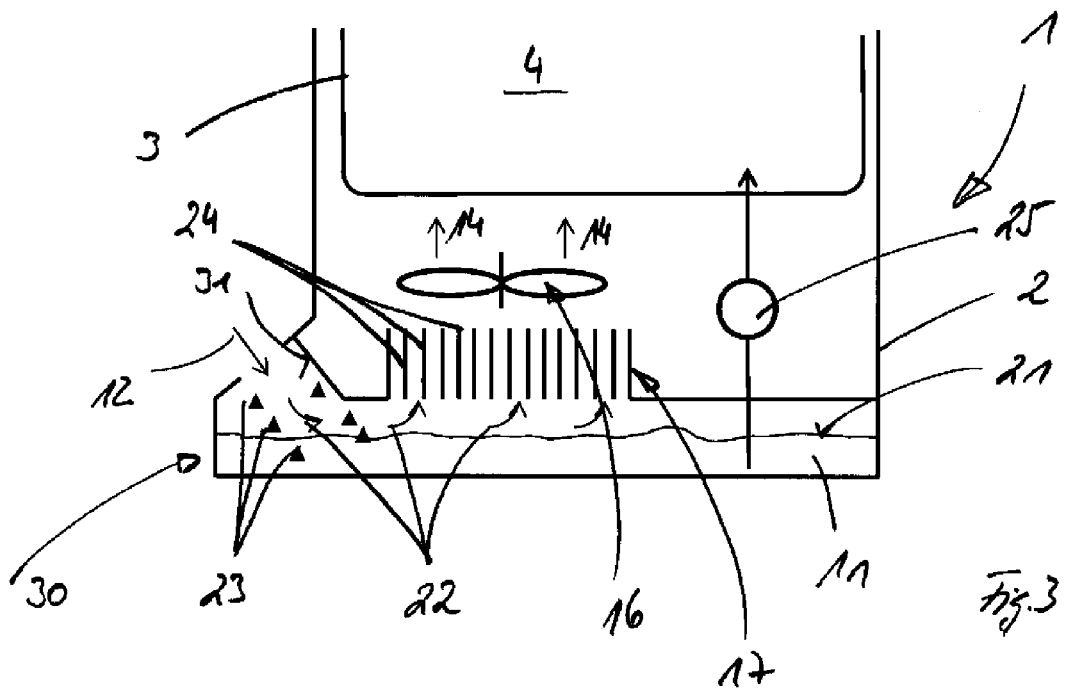
FIG. 3 shows the device according to the invention for wet dust and dirt collection in a schematic lateral view.
Figure 4:
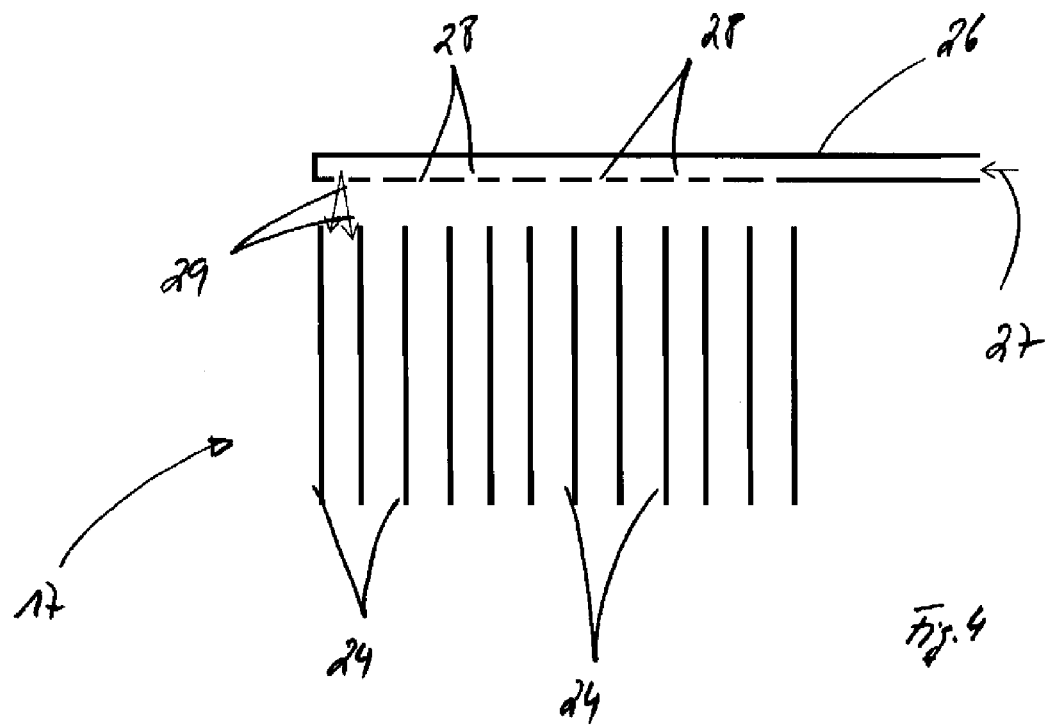
FIG. 4 shows an evaporator equipped with a spray device in a schematic diagram.

The dishwasher 1 according to an embodiment of the invention has a device 30 for wet dust collection. The manner of operation of this device 30 emerges in particular from the diagram according to FIG. 3.

During a specified normal program sequence, ambient air 12 is sucked in by means of the fan 16 of the heat pump device 9 and via an air inlet 10 arrives at the evaporator 17 which, in the embodiment shown, is designed as a finned-tube heat exchanger. In this case, the air inlet 10 is equipped with guide surfaces 31 for the ambient air 12, said surfaces being designed at least in sections to run towards the water surface 21 provided by the water in the water trough 11. As a result of this, the ambient air 12 sucked in by the fan 16 via the air inlet 10 hits the water surface 21 of the water in the water trough 11. The dust and/or dirt particles 23 entrained by the ambient air 12 are deposited for the most part on the water surface 21, as a result of which the ambient air 12 is cleaned before it is routed through the evaporator 17 according to the arrows 22.

The dishwasher 1 is equipped with a pump 25 which, during the course of a specified normal wash program, feeds the water in the water trough 11 into the wash tub 3 provided by said dishwasher 1. The dust and/or dirt particles previously picked up by the water in water trough 11 are pumped out together with the water and carried into the wash tub 3 from where, after the wash program ends, disposal takes place via the disposal connection on the dishwasher.

According to an embodiment of the invention on the process side, it is provided that, at the beginning of a wash program, fresh water 27 is fed into the water trough 11, the fresh water 27, preferably soft water, i.e. softened fresh water, being sprayed over the fins 24 of the evaporator 17. For this purpose, a spray device 26 is provided on the part of the apparatus, which delivers fresh water 27 onto the fins 24 of the evaporator 17 via corresponding openings 28 according to the arrows 29. Spraying of the fins 24 with fresh water 27 has the advantage that any dirt and/or dust particles collecting on the fins 24 are rinsed off and flushed together with the fresh water into the water trough 11. As a result of implementing this process, regular cleaning of the evaporator fins 24 takes place with the result that adhesions of dust and/or dirt particles are permanently prevented.

Feeding of fresh water 27 into the water trough 11 additionally has the advantage that, at the beginning of a wash program and/or when the ambient air is too dry, sufficient water is available in the water trough 11 to achieve filtration in the manner described above of the ambient air 12 that is drawn in with full filtering effect.

In this case, the amount of fresh water fed in at the beginning of a wash program to fill the water trough 11 can be used, just as the condensate arising subsequently, at a later point in the wash program by recycling it such that the overall water consumption is not increased by feeding in the fresh water 27.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 dishwasher
2 housing
3 wash tub
4 washing compartment
5 loading aperture
6 washing compartment door
7 control panel
8 indicator display
9 heat pump device
10 air inlet
11 water trough
12 ambient air
13 air duct
14 exhaust air
15 air outlet
16 fan
17 evaporator
18 compressor
19 condenser
20 expansion device
21 water surface
22 arrow
23 dust and/or dirt particles
24 fin
25 pump
26 spray device
27 fresh water
28 opening
29 arrow
30 device
31 guide surface

What is claimed is:

1. An automatic dishwasher comprising:
   a housing;
   a washing compartment disposed within the housing and configured to receive washing liquid;
   a washing compartment door configured to seal the washing compartment;
   a heat pump device for heating the washing liquid, the heat pump device including:
      an evaporator;
      a fan adapted to supply ambient air to the evaporator; and
      a wet dust collection device connected upstream of the evaporator in a flow direction of the ambient air, the wet dust collection device including a water trough disposed underneath the evaporator;
   a fresh water supply configured to supply fresh water to the water trough; and
   an air inlet including guide surfaces for the ambient air, at least sections of the guide surfaces being adapted to run towards a water surface of the supplied fresh water in the water trough.

2. The automatic dishwasher recited in claim 1, wherein the water trough of the heat pump device acts as a condensate trough.

3. A method for operating the automatic dishwasher according to claim 1, the automatic dishwasher including a water trough, the method comprising:
   feeding the fresh water into the water trough at the beginning of a wash program.

4. The method recited in claim 3 further comprising routing the fresh water using fins of the evaporator.

5. The method recited in claim 4 further comprising spraying the fresh water over the fins.

6. The method recited in claim 4, wherein the volume of fresh water used is in a range between 0.1 liters and 0.5 liters.

7. The method recited in claim 3 further comprising directing water in the water trough into the washing compartment of the automatic dishwasher during the course of the wash program.

8. The method recited in claim 4, wherein the volume of fresh water used is in a range between 0.2 liters and 0.4 liters.

* * * * *